May 3, 1966  AKIRA KOBAYASHI  3,248,881
FULL RANGE AUTOMATIC TORQUE CONVERTER OF HYDROSTATIC TYPE
Filed Sept. 3, 1964  9 Sheets-Sheet 1
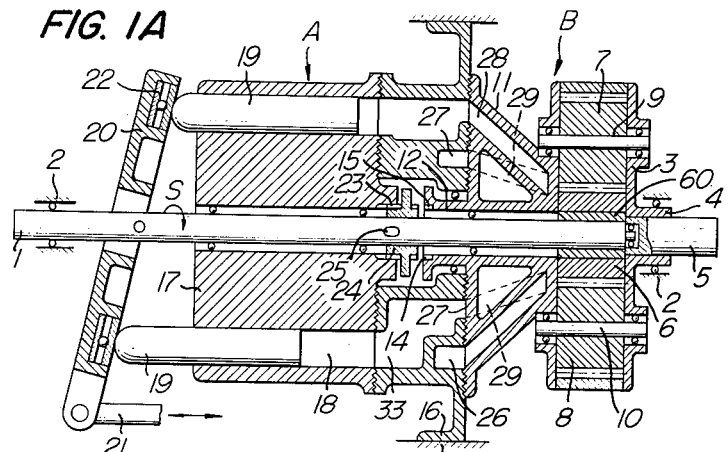
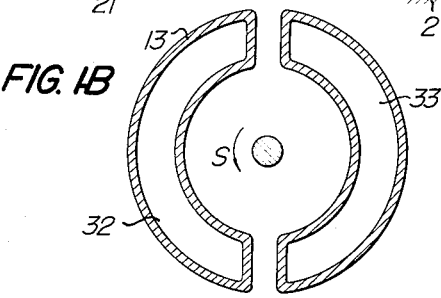
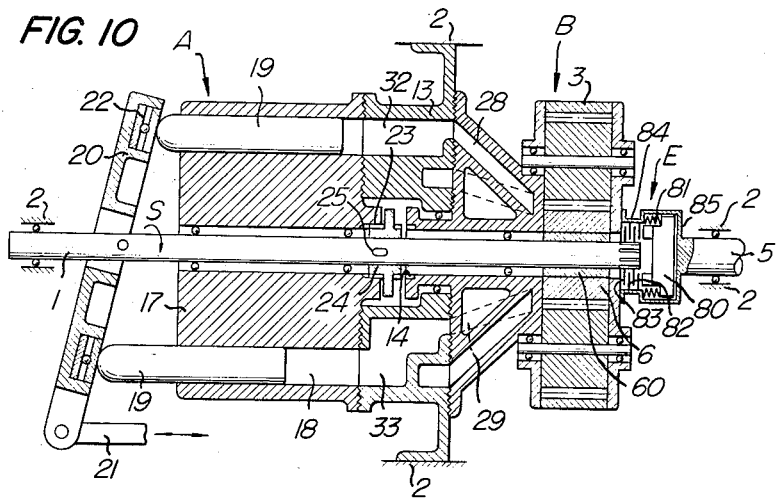
INVENTOR
Akira Kobayashi
By: Paul M. Craig, Jr.
ATTORNEY May 3, 1966  AKIRA KOBAYASHI  3,248,881
FULL RANGE AUTOMATIC TORQUE CONVERTER OF HYDROSTATIC TYPE
Filed Sept. 3, 1964  9 Sheets-Sheet 2

INVENTOR
Akira Kobayashi
By Paul M. Craig, Jr.
ATTORNEY

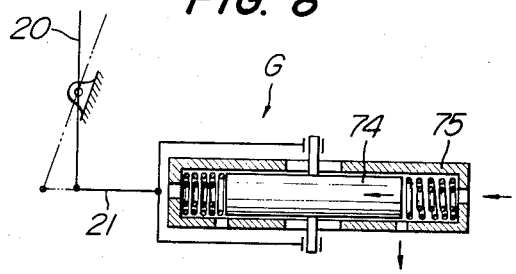
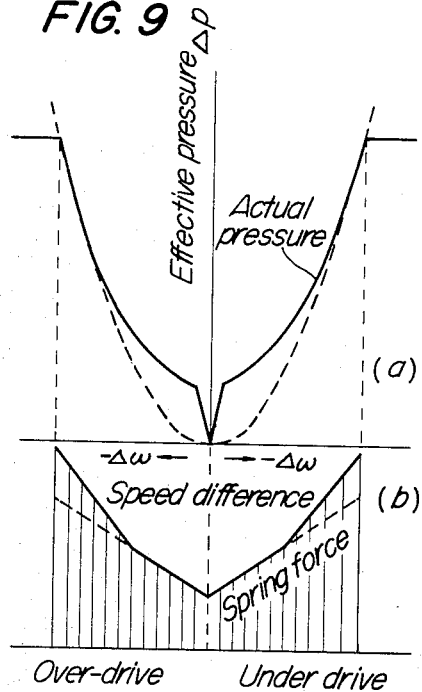
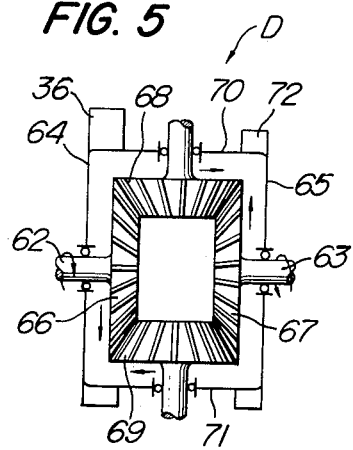

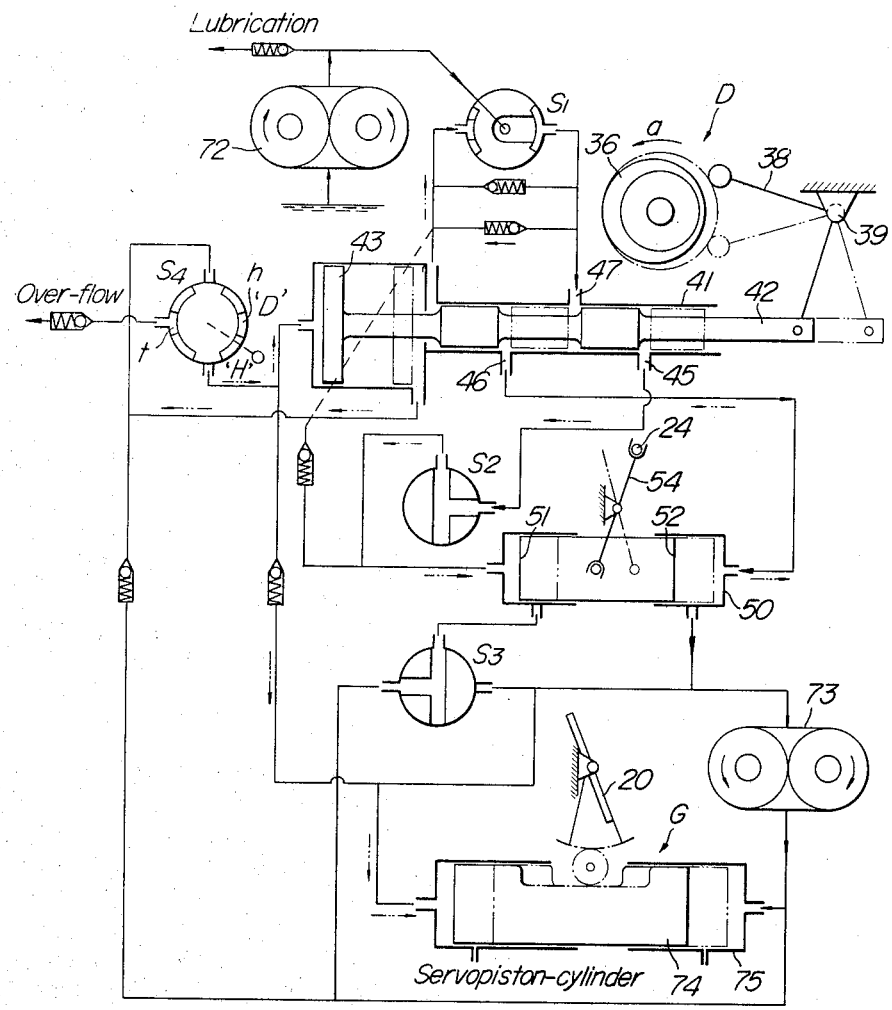
FIG. 7A   Under-drive - - - - → Over-drive

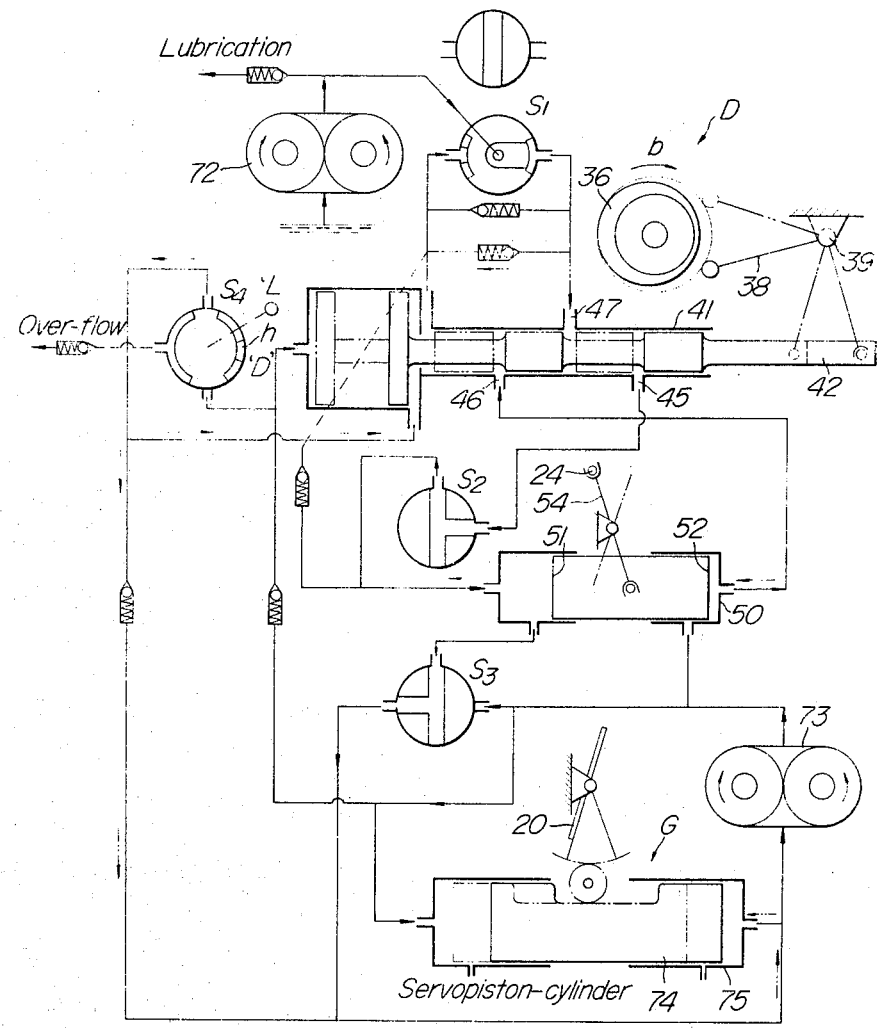
FIG.7B  Over-drive — — — → Under-drive

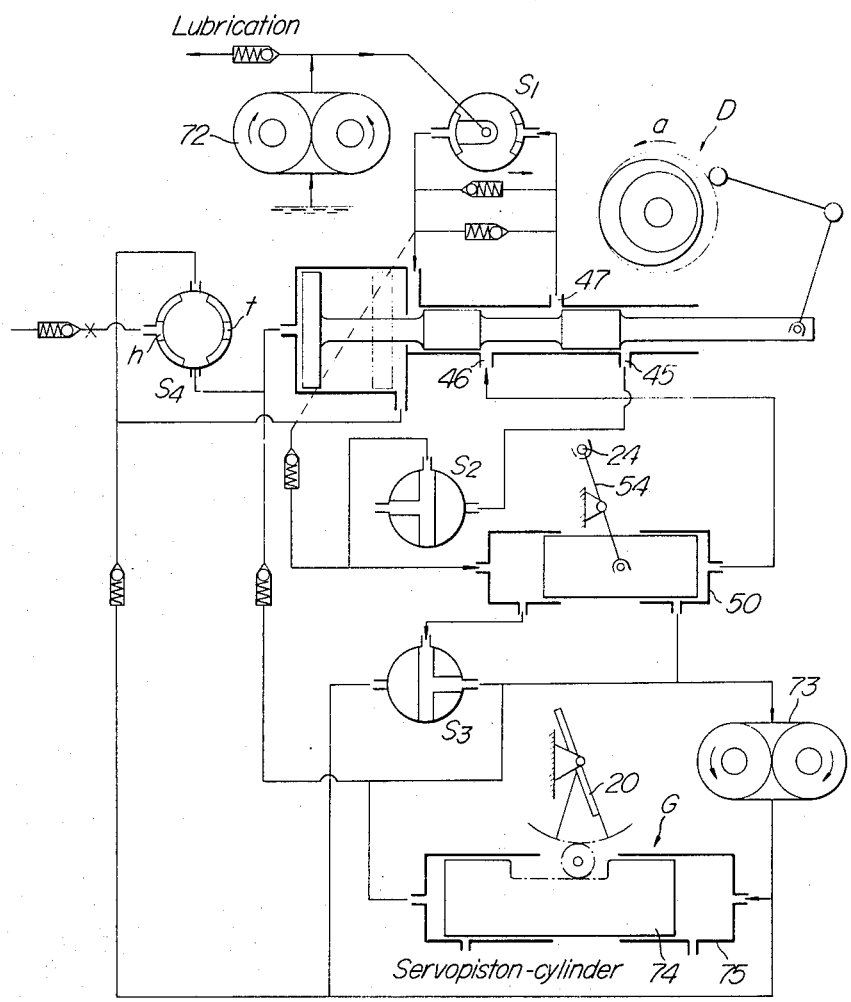
FIG. 7C  Reverse-drive

United States Patent Office 3,248,881
Patented May 3, 1966

3,248,881
FULL RANGE AUTOMATIC TORQUE CONVERTER OF HYDROSTATIC TYPE
Akira Kobayashi, Nagoya-shi, Japan, assignor to Toyota Central Research & Development Laboratories, Inc., Nagoya-shi, Japan, a corporation of Japan
Filed Sept. 3, 1964, Ser. No. 394,132
Claims priority, application Japan, Aug. 18, 1964, 39/45,881
6 Claims. (Cl. 60—53)

The present invention relates to a hydrostatic torque converter operating steplessly in the full range, namely from the under-drive range to the over-drive range in the forward running, the under-drive range in the rearward running and also the neutral idle running or declutching status.

In order to prevent lowering of the power transmission efficiency for the full range of operation, the torque converter according to the present invention operates on the input split principle in the under-drive running range and on the output split principle in the over-drive running range. This switching operation can be carried out by disposing some change-over mechanism such as a clutch mechanism.

An object of the present invention is to provide a hydrostatic torque converter comprising an input shaft; a control fluid motor having a cylinder barrel mounted on said input shaft so as to rotate coaxially with and relatively to said shaft; a plurality of plungers disposed slidably in bores formed in said cylinder barrel and a swash plate disposed out of the outer side of said cylinder barrel and able to change its inclination reciprocatively beyond the neutral position perpendicular to said input shaft and to which the outer ends of said plungers are contacted; an input rotary fluid pump having a rotor connected to the end portion opposite to the end portion carrying said control fluid motor and a casing surrounding coaxially said rotor so as to rotate relatively to said rotor; an output shaft connected to said casing of the input rotary fluid pump in axial alignment with said input shaft; a stationary distributing chamber provided with distributing passages of working fluid and disposed between said control fluid motor and said input rotary fluid pump to connect them hydraulically and clutch means disposed between said control fluid motor and said input rotary fluid pump to connect said cylinder barrel to said casing in the forward under-drive range and to connect said cylinder barrel to said input shaft in the forward over-drive and the reverse-drive ranges.

In the present invention, the rotor of the input rotary fluid pump means connected to the end of the input shaft may be a sun gear meshing with planetary gear.

Accordingly, another object of the present invention is to provide a hydrostatic torque converter comprising an input shaft; a control fluid motor having a cylinder barrel mounted on said input shaft so as to rotate coaxially with end relatively to said input shaft, a plurality of plungers disposed slidably in bores formed in said cylinder barrel and a swash plate disposed near the outer side of said cylinder barrel and able to change its inclination reciprocatively beyond the neutral position perpendicular to said input shaft and to which the outer ends of said plungers are contacted; a planetary gear pump means having a sungear connected to the end portion opposite to the end portion carrying said control fluid motor, planetary gears meshing with said sun-gear and a casing portion supporting said planetary gears and surrounding coaxially said sun-gear so as to rotate relatively to said rotor; an output shaft connected to said casing portion of the planetary gear pump means in axial alignment with said input shaft; a stationary distributing chamber forming distributing passages of working fluid and disposed between said control fluid motor and said planetary gear pump means to connect them hydraulically; and clutch means disposed between said control fluid motor and said planetary gear pump means to connect said cylinder barrel to said casing portion in the forward under-drive range and to connect said cylinder barrel to said input shaft in the forward over-drive and the reverse-drive ranges.

According to the present invention, the torque converter including the combination of a control fluid motor and an input rotary fluid motor is provided, as mentioned above. The planetary gear pump means may be used as said input rotary fluid motor. Further, also an axial plunger type may be used for the input fluid pump means. The construction of the pump of axial plunger type is the same as that of the control fluid motor of the axial plunger type as aforesaid. In this case, the rotor may be the cylinder barrel.

Thus, a further object of the present invention is to provide a hydrostatic torque converter comprising an input shaft; a control fluid motor having a cylinder barrel mounted coaxially with and rotatably about said input shaft, a plurality of plungers mounted slidably in the bores of said cylinder barrel and a casing portion including a swash plate disposed on the inner wall of said casing portion; an output shaft connected to said casing portion of fluid pump means; a stationary distributing chamber forming distributing passages of the working fluid for connecting hydraulically said two barrels, a clutching means connecting and disconnecting said cylinder barrel of the fluid control motor to and from said casing portion of the fluid pump means; and another clutching means connecting and disconnecting said cylinder barrel of the control fluid motor to and from said input shaft.

In the present invention, the forward under-drive running range is obtained by inclining the swash plate to the negative position and connecting said cylinder barrel of the control fluid motor to said casing portion of the input fluid pump means. The forward over-drive running range is carried out by inclining the swash plate of said control fluid motor to the positive position and by connecting said cylinder barrel to the input shaft, while the casing portion of the input rotary fluid pump is released from the connection to said cylinder barrel. The rearward under-drive running range is carried out by inclining the swash plate to the negative position and connecting said cylinder barrel to said input shaft, at this time the control fluid motor acts as a fluid pump, while the cylinder barrel of said control fluid motor is released from the connection to said casing portion.

Therefore, the torque converter of the present invention needs no particular clutch means to effect the above connection and disconnection. The clutch means may be any usual mechanical clutch.

Other objects and advantages of the present invention will be obvious from the description referring to the accompanying drawings, in which:

FIGURE 1A is the longitudinal sectional view showing the hydrostatic torque converter consisting of an input pump B of the planetary gear type and a control motor A of the axial plunger type.

FIGURE 1B is a cross sectional view showing the stationary distributing channels combining the input pump B and the control motor A with working fluid circuit.

Figure 4:
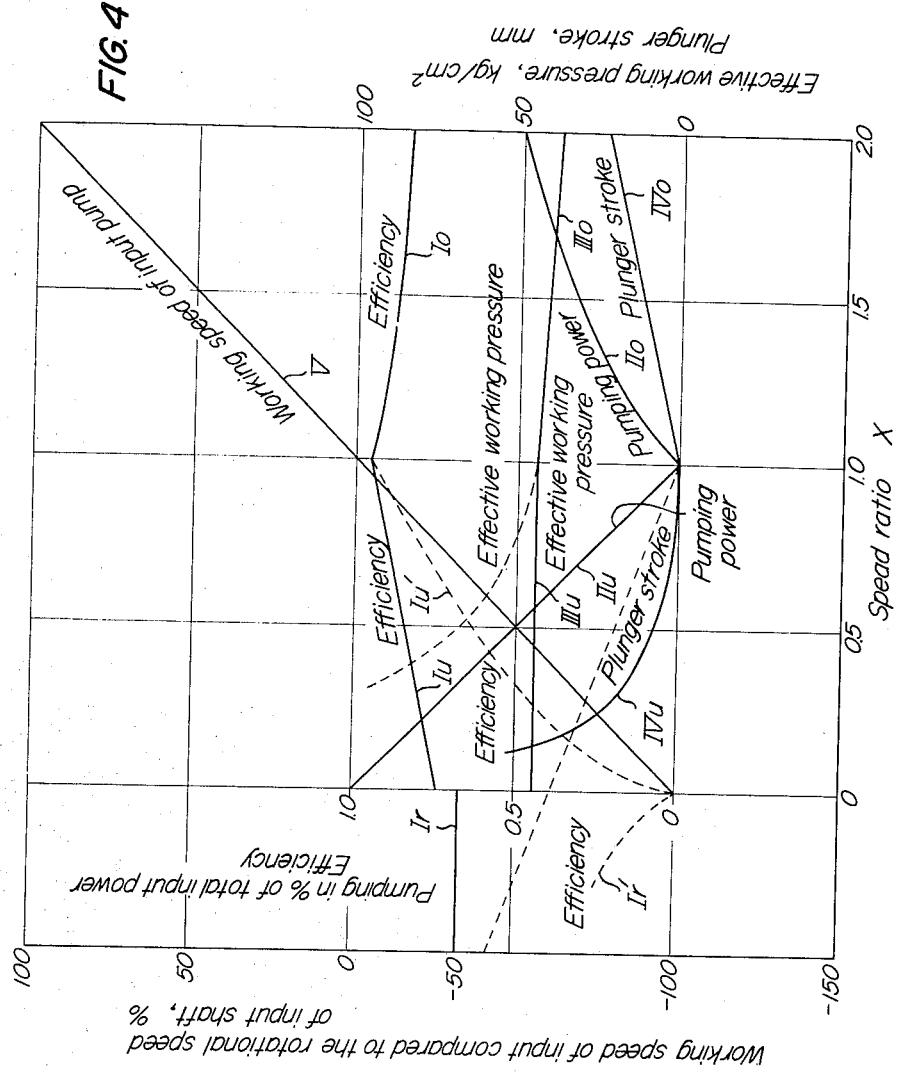

FIGURE 4 shows the operating characteristics of the present torque converter varying with the speed ratio $\chi$ of the output shaft to the input shaft, namely, the power transmission efficiency I, the pumping power ratio to the input power II, the effective working fluid pressure III, the plunger stroke of the control motor IV, and the operating speed ratio of the input pump to the input shaft V, respectively, the suffixes $u$, $o$ and $r$ indicating the under-, over- and reverse drive.

FIGURE 5 shows a differential gear mechanism to drive the actuator pump for the actuator controlling the inclination of the swash plate of the control motor in order to vary the speed ratio $\chi$ of the torque converter. It is used, at the same time, to control the change-over valve and also the clutch action in the connection.

Figure 6:
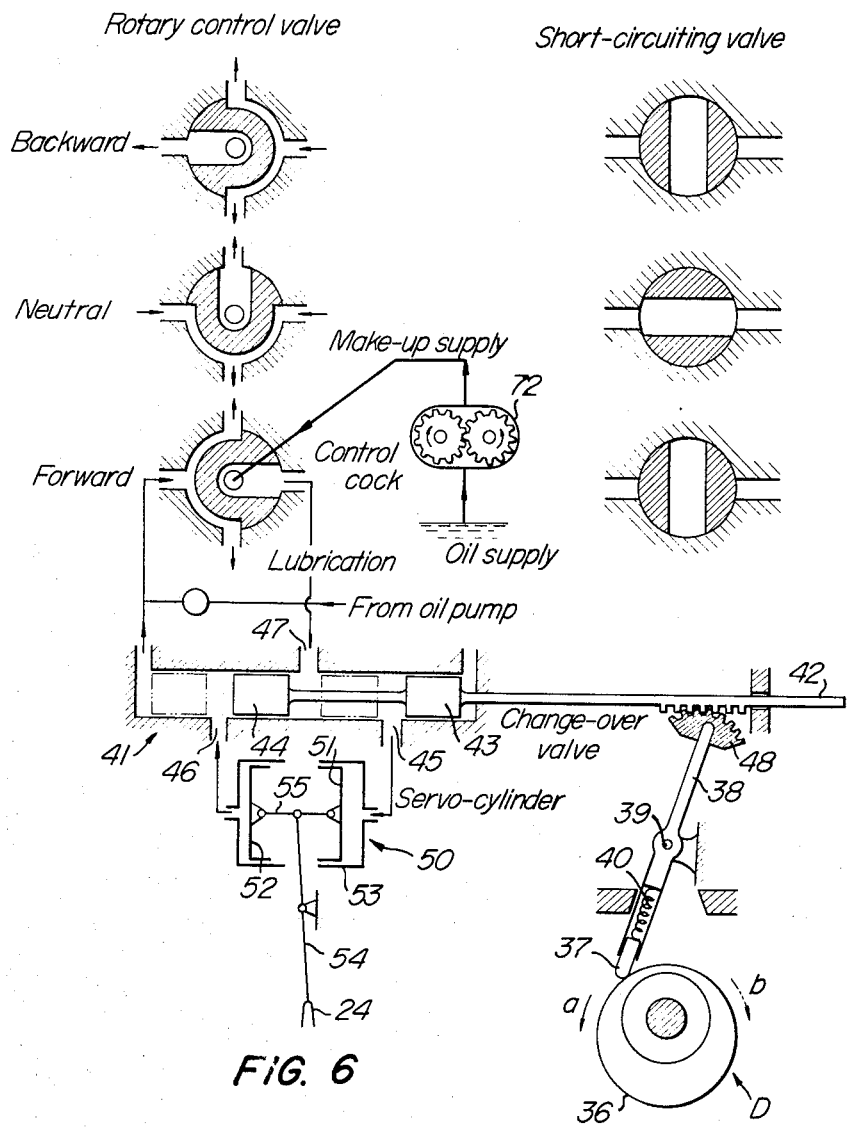

FIGURE 6 shows the control circuits in the converter.

FIGURES 7A, 7B and 7C are diagrammatic illustrations for the operating fluid systems in the forward drive from under- to over-drive, from over- to under-drive and in the reverse-drive, respectively.

FIGURE 8 is a schematic view showing the servo-piston-cylinder means for the actuator to control the speed ratio $\chi$ by tilting the swash plate of the control motor.

FIGURE 9 shows the variation of the effective working pressure on the actuator piston to control the speed ratio $\chi$.

FIGURE 10 shows the multi-disc clutch means to connect the output shaft with the input shaft for the running range in the proximity of direct-drive.

Figure 11:
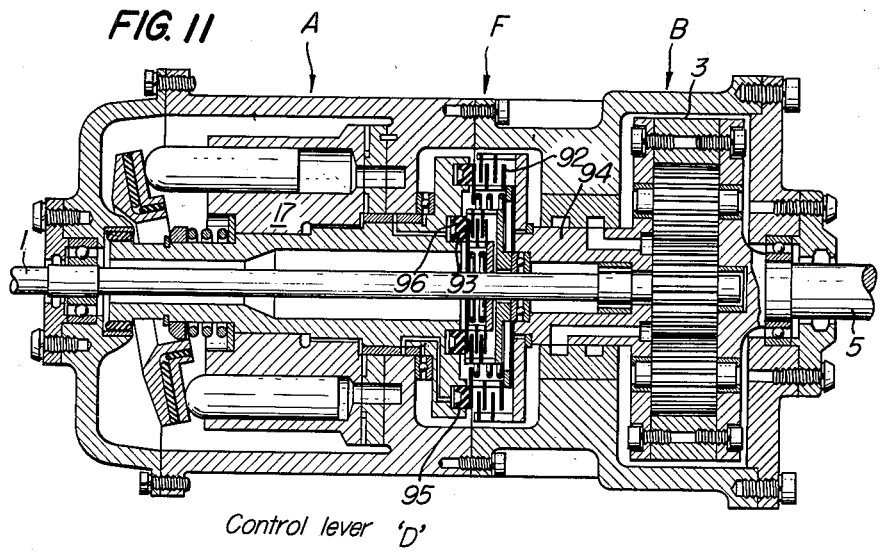

FIGURE 11 is a sectional view showing the torque converter of another embodiment in the present invention, in which two separate clutch of multi-disc type are adapted instead of the change-over clutch as shown in FIGURE 1A.

Figure 12:
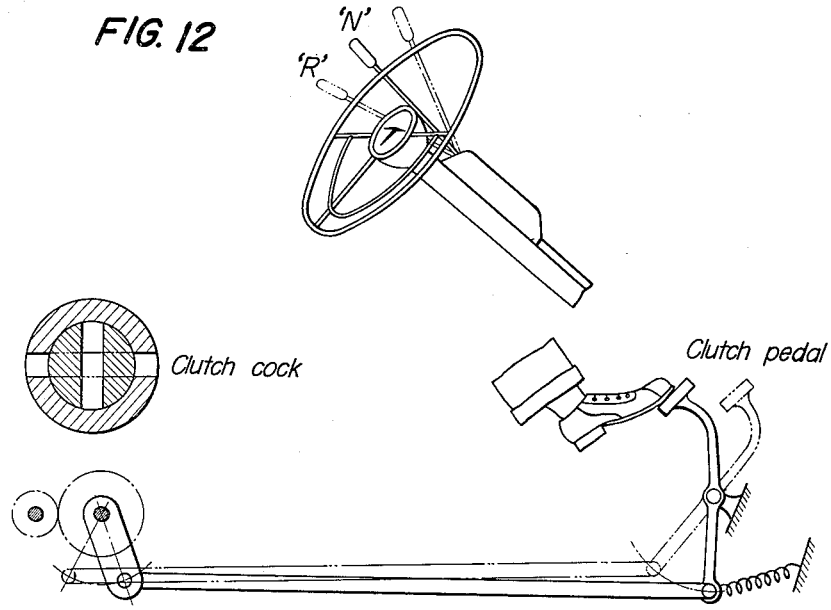

FIGURE 12 is a schematic view showing a driving system of motor cars comprising the torque converter according to the present invention. The control lever assumes three positions, namely, neutral "N," drive "D" and reverse "R."

The present invention relates to a hydrostatic torque converter transmitting an input power to an output shaft in the full range, namely, both in the range between the under-drive, the direct-coupling, and the over-drive range in the forward direction and in the reverse-drive range, and also the neutral idle running range (de-clutching) between them. These running operations can be brought out positively by shifting a single control lever from the position "N" (neutral, idle running) to "D" (forward drive) in the positive direction or to "R" (reverse-drive) in the negative direction, as shown in FIG. 12. The stepless speed control can be obtained by full-automatic devices.

In the present invention, as shown in FIG. 1A, the hydrostatic torque converter consists of an input oil pump B driven by the input shaft and a control fluid motor A driven by the input shaft in the over-drive forward running range and also in the reverse drive. In the under-drive forward running range, the latter works as a fluid motor regenerating the pumping power consumed in the input fluid pump and driving the casing rotating with the output shaft as one body. The control fluid motor A and the fluid rotary pump B are connected by the working fluid circuit, the flow-rate of the working fluid is controlled by tilting the swash plate 20 of the control fluid motor which is of an axial plunger type. In forward drive, the high pressure side and the low pressure side of the working fluid circuit will remain unaltered, but the direction of the fluid flow will be reversed, corresponding to the inclinations of the swash plate 20 from one side to the other. When the swash plate 20 assumes the vertical position, in between, the working fluid in the circuit will cease to flow and the combination of the input pump and the control motor may be locked and they will rotate all together as one block, resulting in a direct-coupled drive.

CONSTRUCTION AND CHARACTERISTIC PERFORMANCE

Figure 2:
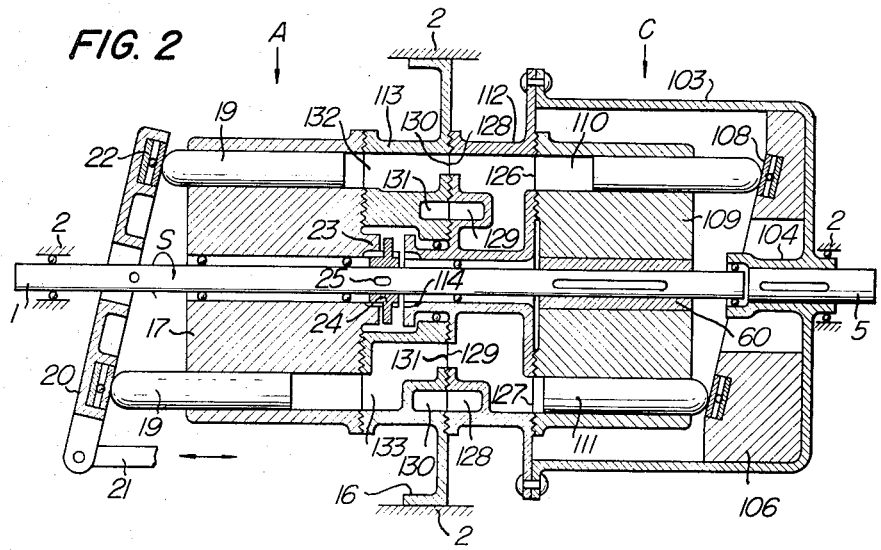
FIGURE 2 shows another type of the hydrostatic torque converter according to the present invention. It consists of an input pump C of the axial plunger type and a control motor A of the same type as before.

The hydrostatic torque converter according to the present invention is illustrated in FIGURES 1A, 1B and FIG. 2. This torque converter comprises a control fluid motor A of an axial plunger type and an input fluid pump B of a planetary gear pump type in FIG. 1A and of an axial plunger type C in FIG. 2, the input shaft driving the sun gear 6 in the former and the cylinder barrel itself 109 in the latter. The circuit of the working fluid is built up combining the rotating input pump B and the control motor A with the high pressure and the low pressure fluid channels in the rectifier fixed to the frame 2. The input shaft 1 is supported with bearings on the frame 2 and on the rotating casing 3 of the input pump B.

The rotating casing 3 with the output shaft 5 is supported by the bearing on the frame 2 and the bearing on the rectifier fixed to the frame 2. The control fluid motor A is mounted on the input shaft 1 freely by the two bearings as shown. The cylinder barrel 17 of the control motor A is coupled to the input shaft 1 in the over-drive running range. The change-over clutch 24 rotating with the cylinder barrel 17 can be shifted to the right to engage with the dog clutch 15 in the casing 12 in the under-drive running range and to the left to engage with the key 25 on the input shaft 1 in the over-drive or in the reverse-drive running range. This change-over of the clutch 24 may be operated by the servo-piston 51 and 52 as shown in FIGURE 6, the flow of the working fluid being controlled by the change-over valves 43 and 44 actuated by the cam 36 driven by the differential gear means D.

In order to ensure the direct coupling of the output shaft 5 to the input shaft 1 for the running range in the proximity of direct-drive, a positive coupling device of a multi-disc type, as shown in FIG. 10, may be necessary. The engagement and disengagement of this multi-disc clutch can be actuated by the fluid pressure from the supply pump 72, as shown in FIG. 7A. The supply of the working fluid may be controlled directly in connection with the tilting motion of the swash plate 20.

The change-over clutching may be effected also by actuating the two separate disc clutches alternately or simultaneously, which is shown in FIG. 11.

The objects and the advantages of the present invention will be obvious from the descriptions referring to the accompanying drawings, in which FIGURES 1A and 1B are sectional views showing the hydrostatic torque converter according to the present invention comprising a control motor A of an axial plunger type and an input pump B of a planetary gear type. FIG. 2 is a sectional view showing another embodiment of the present invention, in which an axial plunger type C is used as the input pump.

Figure 3A:
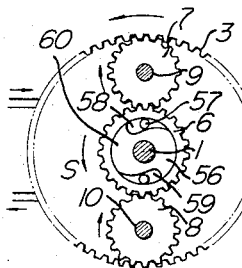
FIGURES 3A, 3B and 3C are end views illustrating the function of the free-wheel mechanism connecting the sun gear of the planetary gear pump to the input shaft in the under-drive and over-drive forward running range, but disconnecting free from the input shaft in the backward running range, respectively.
Figure 3B:
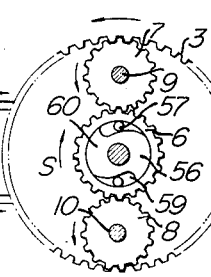
Figure 3C:
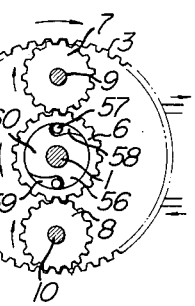

FIGURES 3A, 3B and 3C show the free-wheel coupling of the input pump to the input shaft, ensuring more efficient power transmission in the reverse-drive. FIG. 4 illustrates curve-diagrams showing the relationships between the speed ratio $\chi$ and the power transmission efficiency $\eta$ and also the working speed ratio of the input pump compared to the rotational speed of the input shaft 1 or the effective working pressure $\Delta p$ kg./cm.$^2$ or the plunger stroke $l_m$ mm.

FIG. 5 is a diagrammatically sectional view showing a differential gear means used for controlling the change-over valve 42 and also the clutch action in the connections, as illustrated in FIGS. 1A and 2; FIG. 6 is a diagrammatic view showing an automatic control system in the converters; FIGS. 7A, 7B and 7C are diagrammatic views showing the working fluid pumping systems.

The hydrostatic torque converter according to the present invention is illustrated in FIGURES 1A and 1B. This torque converter comprises a control fluid motor A and a planetary gear pump B. An input shaft 1 to be driven by a suitable power source, for example an internal combustion engine, is supported rotatably by a bearing means in the input end thereof in a suitable stationary frame portion 2. The opposite end of said shaft 1 is supported rotatably by the rotary casing 3 of said planetary gear pump B, so that the input shaft 1 and said casing 3 rotate relatively to each other. The rotary casing 3 is supported rotatively by the sleeve 4, which is provided on the end wall of said casing 3, by the stationary frame portion 2. An output shaft 5 is secured to said sleeve 4.

The planetary gear pump B comprises a sun gear 6 and two planetary gears 7 and 8, wherein said sun gear 6 is connected with the end portion of the input shaft 1 through a free-wheel means 60 arranged between the sun gear 6 and the input shaft 1, and the two planetary gears 7 and 8 are disposed rotatively in position diametrally opposite sides across the center of the rotating shaft 1, of which shafts 9 and 10 are supported between the end walls of said casing 3. The planetary gears 7 and 8 are engaged with the sun gear 6, respectively, forming two separate gear pumps working together.

The rotary casing 3 of the planetary gear pump B is provided with a rotary distributing chamber or a rotary distributor 11 on the inner side wall, having a sleeve portion 12, through which the input shaft 1 passes rotatively in relation to said sleeve portion 12. The end surface of said rotary distribution chamber 11 abuts against the end surface of a stationary distributing chamber 13 so as to slidably rotate relative to said end surface of said stationary distributing chamber 13. There is provided a clutch engaging portion 15 in the end of the sleeve portion 12.

The rotary distributor 11 comprises two annular passages 28 and 29 and these passages are arranged co-axially with the longitudinal axis of the input shaft 1. The passage 28 is connected with the low pressure inlet to the gear pump B and the passage 29 is connected with the high pressure outlet of the gear pump B. The direction of the fluid flow will be reversed when the converter works in the over-drive range.

In the reverse-drive running range, the low pressure and high pressure sides of the circuit are just reverse to the over-drive forward running range, but the direction of the fluid flow is the same as in the under-drive forward running range.

The stationary distributing chamber 13 is attached to the fixed frame portion 2 in the peripheral portion thereof and is provided with an outer flange portion 16 of a cylindrical form, into which the end of a cylinder barrel 17 of the control motor A is inserted to rotate relatively to the stationary distributor 13. In order to prevent any leaks of the working fluid in the circuit, some sealing mechanism between the cylinder barrel 17 and the stationary distributing chamber 13 can be employed. The said cylinder barrel 17 is mounted on the input shaft 1 to rotate relatively thereto.

The cavities 32 and 33 of arcuate shape are provided in the stationary distributing chamber 13. These cavities 32 and 33 serve as distributing passages of the working fluid for the rotating control motor A and the input pump B. The passage 28 communicates with the cavity 32 through an inlet opening 26 thereof. The passage 29 communicates with the passage 33 through the outlet opening 27.

In the cylinder barrel 17 of the control motor A, a plurality of bores 18 parallel to the longitudinal axis, disposed on the same pitch circle with equal pitch distances are formed. Plungers 19 are inserted slidably into said bores 18, respectively. In FIG. 1A, the bores 18 positioned in the right-hand half portion of the rotating cylinder barrel 17 communicate with the cavity 33 and the other bores 18 positioned in the left-hand half portion of the cylinder barrel communicate with the cavity 32.

A swash plate 20 is disposed at the other end of the cylinder barrel 17 so as to oscillate about the diametral axis (trunnioned at each end of the horizontal diametral axis) which passes laterally through the longitudinal axis of the input shaft 1. A control rod 21 is pivoted to the swash plate 20 at the point on the vertical diameter crossing at right angles to the first mentioned diameter. On the inner wall of this swash plate 20, a circular thrust bearing means 22 is disposed. The outer end of each plunger 19 contacts with the thrust bearing means 22. This swash plate 20 may be tilted to the right (as shown in FIG. 1A) in the over-drive forward running range. When the swash plate 20 stands in vertical position, a direct-coupled drive can be attained.

The end surface of the rotary distributing chamber 11 is able to rotate slidably with respect to the end surface of the stationary chamber 13. These two surfaces are maintained in contact with each other so as to prevent leakage therebetween. The sealing means can be selected from the usual sealing means known in the art. In the end wall of the cylinder barrel 17 there is provided a sleeve portion 23 which opposes the sleeve portion 12 of the rotary distributing chamber 11, through which the input shaft 1 is passed. A change-over clutch ring 24 is disposed on the shaft 1 between the sleeves 12 and 23 and rotates together with the cylinder barrel 17 and is able to slide along the input shaft 1 in the longitudinal direction. This clutch ring 24 always engages the sleeve portion 23 through spline gears. When the clutch ring 24 is shifted to the right to engage with the sleeve portion 14 of the rotary distributing chamber 11, the engagement between the clutch ring 24 and the key 25 is released while the engagement with the sleeve portion 23 is kept unaltered. This clutch ring is formed as a tooth-shaped spline and the toothed portion can be engaged with the teeth formed on the inner surfaces of the sleeves 14 and 23, respectively. When the clutch ring 24 engages with the key 25, it connects the input shaft 1 with the cylinder barrel 17 (for over-drive forward running range or reverse-drive running range) and when it engages with the sleeve portion 14, it connects the cylinder barrel 17 through the rotary distributing chamber 11 with the casing 3 (for under-drive range in the forward running range).

As aforesaid, the free-wheel means 60 is disposed between the sun gear 6 of the planetary gear pump B and the input shaft 1. If the sun gear 6 is connected directly with the input shaft 1, in the reverse-drive (back-drive) range, the power transmission efficiency becomes lower as illustrated by the dotted curves Ir' in FIG. 4. This is so because in this case the operating speed in a negative direction of the input fluid pump working as a fluid motor overcomes a rotating speed of the input shaft 1 in the positive direction. Accordingly, in the reverse-drive range of the output shaft, the sun gear 6 must be released from the connection with input shaft 1 and should not receive any negative torque imparted to it by the input shaft 1. In the present invention, as the free-wheel means is provided between the sun gear 6 and the input shaft 1, wherein the driving effect of the input shaft 1 can be transmitted to the sun gear 6 in the normal revolution of the casing 3 of the planetary gear pump B in both of over-drive and under-drive ranges. As shown in FIGURES 3A, 3B and 3C, the free-wheel means 60 comprises a rotary member 56 and locking rollers 57. On the outer peripheral surface of the rotary member 56, one or more grooves 58 and 59 are formed. Each groove has the depth in one end greater than that in the other end. The rotary member 56 is so disposed within a cylindrical bore of the sun gear 6 that it may rotate relatively to the sun gear 6 and is fixed to the input shaft 1 to rotate together therewith. Within the grooves 58 and 59, rollers 57 are placed so as to rotate freely in the deeper ends. When the output shaft 5 rotates in the reversed direction, the sun gear 6 may rotate faster than the input shaft 1 in the normal direction, getting rid of the negative rotating effect.

The operations in the under-drive range are explained as undermentioned. When the clutch ring 24 is shifted to the right to release the engagement with the key 25, it comes into the engagement with the sleeve portion 12 of the rotary distributing chamber 11 of the planetary gear pump B. Thus, the cylinder barrel 17 is connected to the casing 3 of the planetary gear pump B. In this case, the input shaft 1 is rotated in the normal direction or counterclockwise direction shown by arrow S in FIG. 1A, so that the free-wheel means 60 may be locked as shown in FIG. 3A. The control motor A is driven by the pressure fluid from the planetary gear pump B regenerating the consumed pumping power into the motive power to drive the output shaft 5. Pressure fluid from the planetary gear pump B through the passage 29, opening 27 and cavity 33 is supplied to the control motor A and the motive torque thus regenerated is transmitted to the output shaft 5 through the clutch 24 and the casing 3. This regeneration of the power consumed by the pumping in the planetary gear pump B is one of the important features of the present invention.

When the output shaft 5 rotates at a lower speed than the input shaft 1 in the under-drive range operation, the speed ratio $\chi$ is less than unity. In such a case, the planetary gear pump delivers pressure fluid with the following flow-rate.

$V_p = 2\pi d_p b_p h_p (1-\chi)$ cm.$^3$/revolution of the input shaft, where $d_p$, $b_p$ and $h_p$ indicate the pitch diameter, the length and the height of the sun gear respectively.

As described above, the pressure fluid from the planetary gear pump B is supplied to the control motor A and the regenerated motor power is transmitted to the casing 3 of the planetary gear pump B. The flow-rate of the working fluid in this operation is expressed by the following equation:

$$V_m = Z_m \frac{\pi}{4} d_m^2 l_m \chi$$

cm.$^3$/revolution of the input shaft, where $Z_m$, $d_m$ and $l_m$ stand for the number, diameter and stroke of the plungers.

The condition of continuity of the flow rate is $V_p = V_m$, which enables us to determine the stroke $l_m$ of the plunger 19. The speed ratio $\chi$ can be controlled by varying the inclination of the swash plate 20. Such inclination is determined approximately by the following relation:

$$\tan \phi = \frac{l_m}{\frac{1}{2}D} = \frac{1-x}{x} \frac{8 d_p b_p h_p}{Z_m d_m^2} \frac{1}{\frac{1}{2}D}$$

where D denotes the pitch diameter of the pitch circle of the bores in the cylinder barrel 17.

When the swash plate 20 approaches the vertical position, the flow-rate $V_m$ tends to null and the combination of the gear pump B and the control motor A is locked by the fluid in the working circuit, so that a direct-coupled drive ensues.

In order to secure the locked action, the multi-disc clutch E as shown in FIG. 10 to couple the output shaft casing 84 to the input shaft 1 or actuating the two multi-disc clutches F at the same time as shown in FIG. 11, may be of use.

The over-drive range operation of the torque converter according to the present invention is explained as follows. By proper means, the clutch ring 24 is shifted to the left, thereby the clutch ring 24 engages with the key 25 on the input shaft. Accordingly, the cylinder barrel 17 can be driven by the input shaft 1. Also in the case of the over-drive range operation, the input shaft 1 rotates in the counterclockwise direction as shown in FIG. 3B, just in the same way as the under-drive range operation. The sun gear 6 is driven positively by the input shaft 1, free-wheel means being locked.

In the successive rotation of the input shaft 1, the control motor A pumps out high pressure fluid to the rotating planetary gear pump B functioning as a fluid motor in this case and the casing 3 and also the output shaft 5 are driven to rotate faster than the input shaft 1. The direction of the flow in the circuit of the working fluid is just reversed in this case, the higher pressure side and the lower pressure side of the working fluid circuit remaining unaltered. In this case, the control motor A operates as a fluid pump and the planetary gear pump B as a fluid motor.

Both in this over-drive range and in the under-drive range as well, the greater part of the input power drives directly the output shaft, while the remaining part of said input power drives the combination of the input pump B and the control motor A in order to control the speed ratio functioning as a torque converter. This is why a higher efficiency can be expected both in the under-drive and also in the over-drive range.

When the swash plate 20 assumes the vertical position, the control motor A can operate neither as a fluid pump nor as a fluid motor, locking the operation of the planetary gear pump B. As a result, the input shaft drives all members as one block without any relative operation. This is the direct-coupled driving with highest efficiency, as shown in FIG. 4.

The flow-rates of the working fluid in the over-drive running range are expressed by the following equations.

$$V_m = Z_m \frac{\pi}{4} d_m^2 l_m \text{ cm.}^3/\text{revolution of input shaft}$$

$V_p = 2\pi d_p b_p h_p (\chi - 1)$ cm$^3$./revolution of the input shaft $$l_m = \frac{8 d_p b_p h_p}{Z_m d_m^2}(\chi - 1) \text{ cm.}$$

Variations in the plunger stroke $l_m$ are illustrated by the curve IV$_u$ ad IV$_o$ in FIG. 4.

A reverse-drive range operation is explained as undermentioned. In this case, the clutch ring 24 connects the cylinder barrel 17 with the input shaft 1. The swash plate 20 declines to the same side as in the case of the under-drive forward running, so that the direction of the flow in the working fluid circuit is reversed and the planetary gear pump B operates as a fluid motor running in the opposite direction. Thus, a reverse rotation of the output shaft can be obtained.

As the sun gear 6 of the planetary gear pump B is connected to the input shaft through a free-wheel means, as shown in FIG. 3C, the output shaft rotates in the reverse-direction freely from the driving effect of the input shaft 1, or without receiving the normal driving torque thereof on condition that the sun gear 6 rotates faster than the input shaft 1. This operating condition can be obtained by increasing sufficiently the inclination of the swash plate 20, resulting in the increased flow-rate of the working fluid. When the declining of the swash plate is not sufficient, the operation of the reverse-drive itself can be achieved only at lower efficiency of the power transmission.

As described above, the operating speed ratio of the input pump B in FIGURE 1A or C in FIG. 2 is $(1-\chi)$ in the under-drive range and $(\chi-1)$ in the over-drive range as shown by the straight line V in FIG. 4, whereas, the operating speed ratio of the control motor A is $\chi$ in the under-drive range and 1 in the over-drive range and also in the reverse-drive range. Thus, we see that the hydraulic pump and motor in this torque converter operate at lower speed or equal speed compared with the input shaft. At the proximity of the direct-coupled running, which occurs most frequently, the operating speed is so low or null, resulting in longer life of the torque converter, and, in addition to this, in higher efficiency, as shown by the curves I$_u$ and I$_o$ in FIG. 4.

In the under-drive running range, the pump torque $T_p$ of the planetary gear pump B is always equal to the torque $T_1$ of the input shaft 1. The effective working fluid pressure $\Delta p$ is given by the following equation:

$$\Delta p = \frac{T_1}{d_p b_p h_p} kg./cm.^2$$

which is illustrated by curve $III_u$ in FIG. 4, where $T_1=15$ kgm., $d_p=9.2$, $b_p=5.0$ and $h_p=0.863$ cm.

In the over-drive running range, we have two equations as follows:

(1) Pumping power $\omega T_m$ is regenerated in the planetary gear pump working as a fluid motor operating at the speed $(\chi-1)\omega$, where $\omega$ stands for the angular velocity of the input shaft 1. Accordingly $$\omega T_m = (\chi-1)\omega T_p \text{ or } \tau_m = (\chi-1)\tau_p$$

(2) Driving torque $(T_1-T_m)$ on the sun gear 6 of the planetary gear pump B which operates as a fluid gear motor is equal to the output shaft torque $T_o$ in balanced condition of torque. Hence $$T_1 - T_m = T_o \text{ or } 1-\tau_m = \tau_o$$

Here, $$\tau_m = \frac{T_m}{T_1}, \ \tau_p = \frac{T_p}{T_1} \text{ and } \tau_o = \frac{T_o}{T_1}$$

indicate the various torque ratios, respectively.

Combining these two equations, we get $$\tau_p = \frac{1}{\chi}$$

Substituting this relation in the general relation of the fluid motor power equation $$2\pi T_p = \Delta p \cdot 2\pi d_p b_p h_p$$

which gives $$\Delta p = \frac{1}{\chi} \frac{T_p}{d_p b_p h_p} kg./cm.^2$$

This is illustrated by curve $III_o$ in FIG. 4.

As aforesaid, the hydrostatic torque converter of the present invention retains higher efficiency for wide range of speed ratio. This may be explained as follows.

Let $\eta_p$ denote the working efficiency of the combination of the input pump B and the control motor A. Then, the power loss may be expressed as $(1-\eta_p)(1-\chi)\omega T_p'$ and the actual output shaft power becomes $$\{\omega T_1 - (1-\mu_p)(1-\chi)\omega T_p'\}\mu_m$$

where $\eta_m$ denotes the mechanical efficiency of the converter. The power transmisison efficiency can be defined as $$\eta = \frac{\chi \omega T_o'}{\omega T_1} \text{ or } \mu = \chi \tau_o'$$

Thus, we get $$\eta = \{1-(1-\mu_p)(1-\chi)\tau_p'\}\mu_m$$

On the other hand, the output shaft torque $T_o'$ is equal to the sum of the pump torque $T_p'$ and the casing torque $T_c'$ transmitted from the cylinder barrel 17 of the control motor A through the regeneration of the pumping power. This relation gives the following two equations:

$$T_p' + T_c' = T_o' \text{ or } \tau_p' + \tau_c' = \tau_o'$$

$$(1-\chi)\omega T_p' = \chi \omega T_c' \text{ or } (1-\chi)\tau_p' = \chi \tau_c'$$

Combining these two equations, we get $\tau_p' = \chi \tau_o' = \mu$. Substituting this relation in the equation for $\eta$ above derived, we get finally $$\eta = \frac{1}{\frac{1}{\eta_m} + (1-\mu_p)(1-\chi)}$$

which is illustrated by the curve $I_u$ in FIG. 4, assuming $\mu_m = 0.95$ and $\mu_p = 0.75$.

In the over-drive running range, the control motor A works as a fluid pump running at the same speed as the input shaft 1, whereas the planetary gear pump B works as a fluid motor. The loss in this combination may be expressed as $$(1-\mu_p)(\chi-1)\omega T_p'$$

Then we get $$\chi \omega T_o' = \{\omega T_1 - (1-\mu_p)(\chi-1)\omega T_p'\}\mu_m \text{ or }$$

$$\eta = \frac{\chi \omega T_o'}{\omega T_1} = \{1-(1-\eta_p)(\chi-1)\tau_p'\}\mu_m$$

On the other hand, we have $$\tau_p' = \frac{T_p'}{T_1} = \frac{\eta}{\chi}$$

and we get finally $$\mu = \left\{1-(1-\mu_p)(\chi-1)\frac{\mu}{\chi}\right\}\mu_m \text{ or } \mu = \frac{1}{\frac{1}{\mu_m}+(1-\mu_p)\left(1-\frac{1}{\chi}\right)}$$

The curve $I_o$ in FIG. 4 shows the calculated results for $\mu$ in the over-drive range.

If the control motor A is coupled to the input shaft 1 in the under-drive running range, the power transmission efficiency can be expressed by $$\mu' = \frac{1}{\frac{1}{\mu_m}+(1-\mu_p)\left(\frac{1}{\chi}-1\right)}$$

which is shown by curve $I_u'$ in FIG. 4.

In the reverse-drive running range, all the input power is converted into the pressure fluid power in the control motor A running at the same speed $\omega$ as the input shaft 1. This power $\omega T_m$ is regenerated as the motive power $(1+|\chi|)\omega T_p$ which gives the following relations:

$$\omega T_m = (1+|\chi|)\omega T_p$$

or $\tau_m = (1+|\chi|)\tau_p$ where $|\chi|$ denotes the absolute value of the velocity ratio of the output shaft running in the reverse direction. The actual torque ratio of the output torque may be expressed by $$\tau_o' = \frac{\mu}{|\chi|} \text{ and } \tau_p' = \tau_o' + 1 = \frac{\mu}{|\chi|} + 1$$

Hence, we have $$\tau_m' = (1+|\chi|)\left(\frac{\mu}{|\chi|}+1\right)$$

The acual output power $|\chi|\omega T_o'$ is equal to $$\{\omega T_1 - (1-\mu_p)\omega T_m'\}\mu_m$$

Thus, we get $$\mu = \{1-(1-\mu_p)\tau_m'\}\mu_m$$

Combining these two relations, we get $$\mu = \frac{1-(1-\mu_p)(1+|\chi|)}{\frac{1}{\mu_m}+(1-\mu_p)(1+|\chi|)}$$

When the sun gear 6 is driven by the input shaft 1 through the free-wheel mechanism as shown in FIG. 3C, the power transmission efficieny $\mu$ in the reverse driving range, may be expressed by $\mu = \mu_m \mu_p$ and the output torque $$\tau_o' = \mu \frac{T_1}{|\chi|}$$

The effective working oil pressure is given by $$\Delta p = \frac{1}{|\chi|} \frac{T_1}{d_p b_p h_p} kg./cm.^2$$

The power transmission efficiency of the torque converter in the present invention is illustrated by the curves $I_u$, $I_o$ and $I_r$ in FIG. 4.

The input power of the gear pump B is given by the followings. The input power is expressed by $\omega T_1$, whereas the power consumed in the gear pump is given by $(1-\chi)\omega T_p$ in the under-drive running range. This power is regenerated in the control motor A to drive the casing 3 of the gear pump with the torque $T_c$ at the rotational speed $\chi\omega$. This relation gives $$(1-\chi)\omega T_p = \chi\omega T_c$$

or $$(1-\chi)\tau_p = \chi\tau_c$$

On the other hand, the sum of the torques $(T_p+T_c)$ must be equal to the output torque $T_o$. Thus, we have $$T_p + T_c = T_o$$

or $$\tau_p + \tau_c = \tau_o$$

Substituting this relation to the last equation, we get $$\tau_o = \left(1 + \frac{1+\chi}{\chi}\right)\tau_p = \frac{1}{\chi}\tau_p$$

Theoretically, the torque ratio $\tau_o$ being always inversely proportional to the speed ratio $\chi$, we get $$\tau_o = \frac{1}{\chi}$$

Hence, we see $\tau_p = 1$ and $$\tau_c = \frac{1-\chi}{\chi}$$

This means that the pumping torque remains the same as the input torque in the under-drive running range. Thus, the pumping water ratio to the input power is as follows:

$$y = \frac{(1-\chi)\omega T_p}{\omega T_1} = (1-\chi)\tau_p = 1-\chi$$

which is illustrated by straight line $II_u$ in FIG. 4.

In the over-drive running, the output torque $T_o$ is equal to the torque of the casing 3 in the gear pump B exerted by the operation of the control motor A, where the working fluid pressure is supplied by the control motor A running at the same speed $\omega$ as the input shaft 1. That is $$T_c = T_o \text{ or } \tau_c = \tau_o = \frac{1}{\chi}$$

The ratio of the pumping power to the input power is denoted by $y$ as described above. These are shown by curves $II_u$ and $II_o$ in FIG. 4.

$y = 1 - \chi$ in under-drive running range $y = 1 - \frac{1}{x}$ in over-drive running range $$y' = \frac{1}{x} - 1$$

in under-drive running range when the control motor A is coupled to the input shaft 1.

In the embodiment aforesaid, the planetary gear pump B consisting of one solar gear 6 and two planetary gears 7 and 8 arranged within the casing 3 to which the output shaft 5 is connected is used. This gear pump B can be substituted by a fluid pump of axial plunger type C as shown in FIG. 2. This being of a construction similar to the control motor A, the detailed explanations and operations thereof are omitted herein.

The input shaft 1 is supported rotatably by the stationary frame part 2 at the input side and by a sleeve portion 104 of a rotary casing 103 in the pump C. The casing 103 is supported rotatably by a bearing means 2 in the outer end of the sleeve portion 104 to which an output shaft 5 is connected.

An oblique plate 106 is disposed in the output side and comprises a circular thrust bearing means 108. In the rotary casing 103, a cylinder barrel 109 is disposed and connected to the input shaft 1, directly or through freewheel means 60, so that the cylinder barrel 109 may be rotated by the input shaft 1. This cylinder barrel 109 comprises a number of bores 110 extending longitudinally. The number of the bores are seven in combination with the nine bores of the cylinder barrel of the control motor A. This may be preferable in order to avoid any resonating pulsation in the channels of the working fluid circuit. Within each bore is inserted slidably a plunger 111.

A rotary distributing chamber 112 is mounted on the end portion of the casing 103 and this chamber 112 and the cylinder barrel 109 can rotate with sliding relative movement therebetween, but they are kept sealing tight.

A sleeve 114 is provided on the end wall of the chamber 112, which is co-axial with the input shaft 1 and is rotatable relatively to the input shaft 1.

When the cylinder barrel 109 is rotated by the driving shaft 1, the plungers 111 are operated reciprocally by the guide of the oblique plate 106, so that the working fluid is discharged to the control motor A.

As shown in FIG. 2, two apertures 126 and 127 of the arcuate shape are formed on the end surface of the rotary distributing chamber 112, whose end surface is opposed to the input pump C. The two apertures are arranged co-axially to each other and are aligned with the cylinder bores 110. The end wall of the rotary distributing chamber 112 abutting against the end wall of the stationary distributing chamber 113 is provided with two arcuate apertures 128 and 129. These apertures are separated by a vertical wall 34, so that they do not communicate with each other. The aperture 126 is provided for the low pressure operating fluid and it communicates with the aperture 128 in the rotary distributing chamber 112. The aperture 127 is provided for the high pressure operating fluid and it communicates with the aperture 129.

The end wall of the stationary distributing chamber 113, which is placed in relation slidably to the end surface of the rotary distributing chamber 112, is provided with two annular apertures 130 and 131 opposed to the apertures 128 and 129, respectively. The outer annular aperture 130 communicates with a arcuate cavity 132 formed in the peripheral portion of the end of the stationary distributing chamber 113 and the inner annular aperture 131 communicates with another arcuate cavity 133 in the peripheral portion above mentioned. The aperture 130 and the cavity 132 are separated from the aperture 131 and the cavity 133 by means of the wall 134 not shown in FIGURE 2, so that the formers do not communicate with the latters.

Also in this embodiment, the clutching means explained as aforesaid can be employed. The clutch ring 24, in the under-drive running range, is shifted to the right hand by a proper mechanism. Then, the clutch ring comes into the engagement with sleeve portion 114 of the rotary distributing chamber 112 and into the disengagement with the key 25 on the input shaft 1. As described in the explanations relating to the under-drive operation of the first embodiment illustrated in FIG. 1A, the control motor A is driven by the pump C with the pressure fluid delivered from this pump C, whereby the regeneration of the power is obtained, transmitting the driving torque to the rotary casing 103 of the pump C.

In the over-drive range operation, the clutch ring 24 is moved to the left hand, so that it may be engaged with the input shaft 1 and the cylinder barrel 17 of the control motor. The motor power supplied to the input shaft 1 rotates the cylinder barrel 109, so that the plungers 111 are moved reciprocally by the guide of the oblique plate 106 and the working fluid is discharged in the return strokes towards the left hand in FIG. 2. The working fluid discharged from the pump C is sucked-in to the bores 18 through the aperture 127 and 129 of the rotary distributing chamber 112, the aperture 131 and the cavity 133 in the stationary distributing chamber 113. The plungers 19 pump out the pressure working fluid to the pump C through the cavity 132, the apertures 130, 128 and 126, in order to drive the pump C working as a fluid motor in this case.

The greater part of the input power drives directly the output shaft and the remaining part operates the control motor A as a fluid pump. This pump drives the pump C as a fluid motor. Thus, the over-drive operation can be obtained.

In the present invention, an automatic speed control system is provided for the torque converter aforesaid. When the driving torque of the output shaft is in balance with the resisting torque, its rotational speed is kept constant. If not so, it will slow down or speed up, resulting in direct increase or decrease of the speed difference between the input and the output shafts of the torque converter. This will be picked-up in quick response by the rotation of the differential gear box means D as shown in FIG. 5 arranged between the two shafts. Furthermore, the gear box D will rotate at the same speed as the differential speed, in magnitude and also in rotational direction. It will cease revolving in direct-coupled running. The fluid pump 73 in FIG. 7A, 7B and 7C of gear type driven by the differential gear box D in FIG. 5 will discharge pressure fluid corresponding to the speed difference in one direction in the under-drive range and in the opposite direction in the over-drive range, as shown in FIGS. 7A and 7B, respectively. Such phenomena are made of use for tilting the swash plate 20 in order to control the speed ratio in the torque converter and also for changing-over the coupling of the cylinder barrel 17 of the control motor A with the input shaft 1 or with the casing 3 of the gear pump B, according to the over-drive or the under-drive running.

One embodiment of such differential gear box means is illustrated in FIG. 5. In this differential gear box means D, an input shaft 62 is supported in an end wall 64 and an output shaft 63 is supported in the other end wall 65, respectively and rotatably. A bevel gear 66 is attached to the shaft 62 and a bevel gear 67 to the shaft 63. Bevel gears 68 and 69 are meshed with the bevel gears 66 and 67, respectively. The bevel gear 68 is supported rotatably in an end wall 70 and the bevel gear 69 is supported rotatably in the opposite wall 71.

When the rotational speeds of shafts 62 and 63 are different from each other, the casing of the differential gear means D rotates according to the shaft 62 or the shaft 63, as shown in Table 1. By making use of the differential gear means D, the switching operations of the clutch means 24 in FIG. 1A is easily carried out automatically.

*Table 1*

| Revolutional velocity. Operating range | Input shaft | Output shaft | Differential gear box | Remarks |
|---|---|---|---|---|
| Forward over-drive | $+\omega_1$ | $-\omega_0$ | $-(\omega_0-\omega_1)$ | $\omega_1 < \omega_0$ |
| Forward direct-coupled | $+\omega_1$ | $-\omega_0$ | 0 | $\omega_1 = \omega_0$ |
| Forward under-drive | $+\omega_1$ | $-\omega_0$ | $+(\omega_1-\omega_0)$ | $\omega_1 > \omega_0$ |
| Reverse-drive | $+\omega_1$ | $+\omega_0$ | $+\frac{\omega_1+\omega_0}{2}$ | $\omega_1 \gtreqless \omega_0$ |

However, some means are needed for employing this differential operation generated in the differential gear means D to the speed control of the torque converter. Such means may be a gear pump driven by the differential gear means D. In this mechanism, the outer periperal surface of the rotary casing is formed into a cam shape 36 as illustrated in FIG. 6 by the surface D. Therefore, the cam 36 provided on the casing of the differential gear means D rotates in response to the differential speed between the shaft 62 (the input shaft 1) and the shaft 63 (the output shaft 5). This rotation is employed to be switching of the clutch means 24.

In the present invention, a servo-piston-cylinder means 50 in FIG. 6 is connected with the clutch ring 24. The clutch ring 24 is connected with either of the input shaft 1 of the rotary casing 3 of the gear pump B. The switching operation is performed by a change-over valve 41.

A cam operating lever 38 is pivoted to a proper stationary portion by a pivot pin 39 so as to oscillate about the pivot pin 39. Cam follower 37 is disposed slidably in relation to the lever 38 in the outer end thereof. The cam follower 37 is held to keep contact with the cam 36 by a spring 40.

The other end of the lever 38 is engaged with a piston rod 42 through a gear means 48 to move reciprocally the piston rod 42. Two pistons 43 and 44 are disposed on the piston rod 42 and these two pistons are operated by the rod at the same time. The change-over valve is provided with outlet openings 45 and 46 and an inlet opening 47 in the intermediate position therebtween. The pistons 43 and 44 always operate in the opposite outer sides of the inlet opening 47, so that the inlet opening 47 is not closed at any time by the pistons 43 and 44.

When the pistons 43 and 44 are moved towards the left end, the working fluid is supplied to the servo-piston-cylinder means 50 through the inlet opening 47 and the outlet opening 45 and returned to the outlet opening 46.

In case, the cam 36 continues its revolution in the direction shown by the arrow $a$, the lever 38 keeps the status illustrated. If the direction of the rotation of the cam 36 is reversed as shown by the arrow $b$, the cam follower 37 may be moved towards the right hand by this opposite rotation of the cam 36, so that the lever 38 rotates in the counterclockwise direction. As the result, the rod 42 is shifted towards the left end in FIG. 6. Therefore, the passage of the working fluid is switched from the outlet opening 45 to the outlet opening 46. Thus, the working fluid from the outlet 46 is supplied to the opposite side of the servo-piston-cylinder means 50.

The servo-piston-cylinder means 50 comprises two pistons 51 and 52 disposed slidably within the cylinder 53. An operating lever 54 is connected to the intermediate portion of a piston rod 55 at one end thereof and the other end of the lever 54 is connected to the clutch ring 24.

From the above descriptions, it will be understood that the clutch ring can be operated to switch the status of the torque converter by the differential operations of the differential gear means D.

The gear pump in FIGS. 7A, 7B or 7C driven by the differential gear means D as shown in FIG. 5 discharges pressure fluid. The flow-rate of this working fluid can be assumed as $k_0\Delta\omega$, where $\Delta\omega$ indicates the difference of the rotational velocity between the input shaft 1 and the output shaft 5 in FIG. 1A. Furthermore, the direction of the fluid flow depends on the sense of the velocity difference $\Delta\omega$, as shown in the annexed table. This working fluid is supplied to the servo-piston cylinder 75 as shown in FIG. 8. Let the speed of the piston 74 be $\omega_1$, the piston surface $F_1$ and the effective fluid pressure working on the piston $\Delta p$. The working fluid finds the outlet opening from the servo-cylinder 75 where the flow area through the outlet opening is $F_2$ and the spouting velocity of the working fluid is given by $$\omega_2 = C\sqrt{2g\frac{\Delta p}{\gamma}}$$

Here, $C$ denotes the discharge coefficient, $\Delta p$ the pressure difference through the outlet opening, $\gamma$ the specific weight of the working fluid and $g$ the gravitational acceleration.

The condition of continuity of the flow-rate gives the following relation:

$$k_0\Delta\omega = \omega_1 F_1 + \omega_2 F_2$$

Here, $\omega_1 F_1$ may be assumed as $k_1\Delta\omega$, namely, directly proportional to the operating speed of the gear pump 73.

Then, we get the following expression for the effective working pressure $\Delta p$ on the servo-piston 74 to control the inclination of the swash plate and then the speed ratio of the torque converter.

$$\Delta p = K(\Delta\omega)^2$$

where $$K = \left(\frac{k_0 - k_1}{CF_2}\right)\frac{\gamma}{2g} = \text{constant}$$

$k_1$ may be taken as null in actual cases.

Thus, we see the effective pressure on the servo-piston 74 corresponds to the velocity difference $\Delta\omega$ between the input shaft and the output shaft. The variation of this effective pressure $\Delta p$ is expressed by a parabola as shown in dotted lines in FIG. 9. The outlet opening area $F_2$ can be diminished by degrees through the covering action of the servo-piston skirt at the proximity of its neutral position. Thus, we get more effective working pressure near the neutral position of the servo-piston 74, as shown in full lines in FIG. 9.

A compound spring as shown in FIG. 8 may be used for balancing the fluid pressure $p\Delta F_1$ on the servo-piston 74. This operation on the servo-piston is used for the automatic speed control of the torque converter by pulling or pushing the swash plate rod 21 in FIG. 1.

For the operation of the torque converter of the present invention, a control lever is provided in order to change-over the fluid flow. This change-over means consists of several change-over valves $S_1$, $S_2$, $S_3$ and $S_4$ revolvable as one cylindrical body. As shown in FIG. 12, when the control lever assumes the neutral position "N" the high pressure side and the low pressure side of the main circuit of the working fluid is short-circuited, as shown in FIGURE 6. This is the neutral position and the torque converter may be rendered out of operation. Next, the control lever may be shifted to the drive position "D." Then all the control valves $S_1$, $S_2$, $S_3$ and $S_4$ assume the configurations as shown in FIG. 7A.

FIGURES 7A, 7B and 7C show the speed control system according to the present invention. In FIG. 7A, the status of the under-drive range running is shown by solid lines and the status of shifting the over-drive range running is shown by dotted lines.

When the torque converter operation changes from under-drive range to the direct-coupling running, the cam 36 on the differential gear box D comes to rest and the lever 38 may continue to assume the same position as shown by the arrow $a$. If the operator wishes to step into the over-drive range running of the torque converter, he shifts the control lever from the position "D" (horizontal position in FIG. 7A) to the position "H." Then the high pressure fluid from the high pressure side of the working fluid circuit rushes through the pipings shown by arrows in dotted lines. Thus, the change-over valve 42 may be pushed to the left by the fluid pressure working on the right-hand surface of the piston 43, and the pressure fluid from the supply pump 72 pushes the servo-piston 51 to the right, switching-over the clutch to start the over-drive range running. At the same time, the pressure fluid from the main circuit of the torque converter rushes through the check valve and push the servo-piston 74 to the right tilting the swash plate 20 to the opposite side to assume the configurations for the over-drive range operation, ensuing on the over-drive range. Then, the control lever must be shifted back to the normal position "D" for the forward drive.

FIG. 7B illustrates the changing-over of the configurations from the over-drive range to the under-drive range over the direct-coupling.

FIG. 7C illustrates the operation for the reverse-drive range. The control lever is shifted to the reverse-drive position "R." Then, the clutch ring 24 connects the cylinder barrel 17 of the control motor A to the input shaft 1, and the servo-piston 75 tilts the swash plate 20 to the same side as the under-drive forward running, ensuing on the reverse-drive running range.

As alluded before, some kinds of positive coupling devices between the input and output shafts may be needed for the direct-coupled running in order to avoid the rattling of the gear pump operaing at dead slow speed. Such procedure is also effective for the smooth and silent engagement of the clutch ring 24 to the input shaft 1 or to the output shaft casing 3, the synchronizing therebetween being necessary to some extent.

A multi-disc clutch device E in FIG. 10 is designed to couple the input shaft 1 to the output shaft casing 84, the clutching force being applied by the fluid pressure on the servo-piston 80. The pressure fluid is supplied from the supply pump 72 in FIG. 6 driven constantly by the input shaft 1. The supply and cut-out of the working fluid to the servo-piston 80 is actuated by the controlling motion of the swash plate 20 in FIG. 1A. The coupling is effected at the proximity of the direct-coupling status, say, for the speed ratio $\chi$ ranging between 0.95 and 1.05. Beyond such range, $\chi < 0.95$ or $\chi > 1.05$, the supply of the working fluid to the servo-piston is cut-out automatically with the tilting of the swash plate 20 and then the spring action 81 releases the multi-disc clutch.

Similar operation can be effected by the combination of two separate clutches 92 and 93 of multi-disc type F as shown in FIG. 11. The clutch 92 is to engage the cylinder barrel 17 of the control motor A to the output shaft casing 3 for the under-drive range and 93 is to engage the same cylinder barrel to the input shaft 1 for the over-drive forward and reverse-drive ranges. For the direct-coupled drive, both clutches 92 and 93 come into action at the same time.

POINTS OF THE PRESENT INVENTION

(1) STEPLESS SPEED CONTROL

The speed control of the torque converter is achieved by the combination of the input pump B in FIG. 1A or C in FIG. 2 and the control motor A, the operation being so-called split principle in the power transmission. This combination of split type comprises an automatic change-over device from the under-drive to the over-drive range or vice versa. A positive change-over operation can also be done by shifting the control lever.

(2) HIGHER EFFICIENCY AND LONGER LIFE

The main object of this combination of split type with automatic change-over device is to keep higher values of the power transmission efficiency of the torque converter as a whole, and, at the same time, to secure longer life of use owing to the lower speed of operation of the hydraulic pump and motor.

(3) FULL AUTOMATIC SPEED CONTROL

The full automatic speed control of the torque converter for the full range of the forward drive can be achieved keeping the driving engine to run at more economical conditions.

(4) FULL RANGE CONTROL OF THE OPERATION

The forward drive, neutral and reverse drive of the torque converter is obtained by simple shifting of the control lever as shown in FIG. 12.

(5) DECLUTCHING

By operating the clutch pedal as shown in FIG. 12, the working fluid circuit is short-circuited and declutching effect can be obtained, if necessary, for idle running of the driving engine or inertia running of the car itself.

(6) EFFECTIVE ENGINE BRAKE

In the down-hill drive of cars, more effective engine brake may be expected. This can be obtained by shifting the control lever so as to get the operation of the torque converter in the under-drive range.

What is claimed is:

1. A hydrostatic torque converter comprising an input shaft; a control motor having a cylinder barrel disposed rotatably about said input shaft, pistons slidably disposed within cylinder holes extending longitudinally and parallel to said input shaft and a swash plate able to change its inclination and to which the outer ends of said pistons are contacted; a planetary gear pump means having a sun-gear rotatable about said input shaft, planetary-gears engaging with said sun-gear and a casing supporting said gears; an output shaft provided on said casing coaxially to said input shaft; a stationary distributing chamber for operating fluid for said cylinder holes in said control motor; a rotary distributing chamber for the operating fluid disposed between said stationary distributing chamber and said casing of the planetary gear pump means; a clutch means for connecting said cylinder barrel to said casing and disconnecting said clutch means and said cylinder barrel from each other; characterized by the fact that means permitting the rotation of said sun-gear faster than that of said input shaft in one direction and locking together said sun-gear and said input shaft in the opposite direction is provided between said sun-gear and said input shaft.

2. A hydrostatic torque converter comprising an input shaft; a control motor having a cylindrical barrel disposed rotatably about said input shaft, pistons slidably disposed within cylinder holes formed longitudinally and in parallel to said input shaft in said barrel and a swash plate able to change its inclination and to which the outer ends of said pistons are contacted; a planetary gear pump means having a sun-gear rotatable about said input shaft, planetary gears engaging with said sun-gear and a casing supporting said gears; an output shaft; a stationary distributing chamber for the operating fluid for said cylinder holes in said control motor; a rotary distributing chamber for the operation fluid disposed between said stationary distributing chamber and said casing of said planetary gear pump means; a clutch means for connecting said cylinder barrel to said casing and disconnecting said cylinder barrel and said casing from each other; characterized by the fact that a friction clutch means having friction plates and a piston operating said friction plates is disposed between said output shot and said casing of said planetary gear pump means.

3. A hydrostatic torque converter comprising an input shaft; a control motor having a cylinder barrel disposed rotatably about said input shaft, pistons slidably disposed within cylinder holes formed longitudinally and in parallel to said shaft in said barrel and a swash plate able to change its angle of inclination and to which the outer ends of said pistons are contacted; a planetary gear pump means having a sun-gear rotatable about said input shaft, planetary gears engaging with said sun-gear and a casing supporting said gears; an output shaft provided on said casing; a stationary distributing chamber for operating fluid for said cylinder holes in said control motor; a rotary distributing chamber for the operating fluid disposed between said stationary distributing chamber and said casing of said planetary gear pump means; a free wheel means disposed between said input shaft and said sun-gear, said free wheel means permitting the rotation of said sun-gear faster than that of said input shaft and locking together said sun-gear and said input shaft; characterized by a first clutch means comprising frictional plates rotatable together with said cylinder barrel, other frictional plates rotatable together with said input shaft and a piston operating said frictional plates to contact them and a second clutch means comprising frictional plates rotatable together with said cylinder barrel and other frictional plates cooperating with said last mentioned frictional plates and rotatable with said casing of said planetary gear pump means.

4. A hydrostatic torque converter having a forward under-drive range, a forward over-drive range and a reverse-drive range, said torque converter comprising an input shaft, a control fluid motor having a cylinder barrel mounted on said input shaft so as to rotate coaxially and relatively to said input shaft, a plurality of plungers disposed slidably in bores formed in said cylinder barrel and a swash plate on said input shaft disposed adjacent an end portion of said cylinder barrel, the inclination of said swash plate being changeable reciprocatively beyond a neutral position perpendicular to said input shaft, the outer ends of said plungers being in contact with said swash plate; an input rotary fluid pump having a rotor and connected to an end portion of said cylinder barrel opposite to said first-named end portion and a casing coaxial with and surrounding said rotor, said casing being rotatable relatively to said rotor; an output shaft connected to said casing in axial alignment with said input shaft; a stationary distributing chamber provided with distributing passages for working fluid and disposed between said fluid control motor and said rotary fluid pump to connect them hydraulically; and clutch means disposed between said control fluid motor and said input rotary fluid pump effective to connect said cylinder barrel to said casing in said forward under-drive range and to connect said cylinder barrel to said input shaft in said forward over-drive and said reverse-drive ranges.

5. A hydrostatic torque converter having a forward under-drive range, a forward over-drive range and a reverse-drive range, said torque converter comprising an input shaft, a control fluid motor having a cylinder barrel mounted on said input shaft so as to rotate coaxially with and relatively to said input shaft, a plurality of plungers disposed slidably in bores formed in said cylinder barrel and a swash plate disposed on said input shaft adjacent an end portion of said cylinder barrel, the inclination of said swash plate being changeable reciprocatively beyond a neutral position perpendicular to said input shaft, the outer ends of said plungers being in contact with said swash plate; a planetary gear pump means having a sun-gear connected to an end portion of said cylinder opposite said first-named end portion, planetary gears meshing with said sun-gear and a casing portion supporting said planetary gears, said casing portion being coaxial with and surrounding said sun-gear, said casing being rotatable relatively to said rotor; an output shaft connected to said casing portion in axial alignment with said input shaft; a stationary distributing chamber comprising distributing passages for working fluid, said passages being disposed between said control fluid motor and said planetary gear pump means and being effective to connect them hydraulically; and clutch means disposed between said control fluid motor and said planetary gear pump means effective to connect said cylinder barrel to said casing portion in said forward under-drive range and to connect said cylinder barrel to said input ssaft in said forward over-drive and said reverse-drive ranges.

6. A hydrostatic torque converter comprising an input shaft; a control fluid motor having a cylinder barrel mounted on said shaft so as to rotate coaxially with and relatively to said input shaft, a plurality of plungers disposed slidably in bores formed in said cylinder barrel and a swash plate disposed on said input shaft adjacent an end portion of said cylinder barrel, the inclination of said swash plate being changeable reciprocatively beyond a neutral position perpendicular to said input shaft, the outer ends of said plungers being in contact with said swash plate; an input fluid pump means having a cylinder barrel connected to an end portion of said input shaft, a further plurality of plungers disposed slidably in bores formed in said cylinder barrel, a casing portion having an oblique plate on its inner surface, the outer ends of said further plurality of plungers being in contact with said oblique plate; an output shaft connected to said casing portion of the fluid pump means in axial alignment with said input shaft; a stationary distributing chamber forming distributing passages of the working fluid for connecting hydraulically said two cylinder barrels, said chamber being disposed between said barrels; a clutching means connecting and disconnecting said cylinder barrel of the fluid control motor to and from said casing portion of the fluid pump means; and a further clutching means connecting and disconnecting said cylinder barrel of the control fluid motor to and from said input shaft.

No references cited.

EDGAR W. GEOGHEGAN, *Primary Examiner*.